(12) United States Patent
Ennerdal (10) Patent No.: US 6,726,250 B2
(45) Date of Patent: Apr. 27, 2004

(54) SEAT-BELT PRE-TENSIONER (75) Inventor: Leif Ennerdal, Alingsäs (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 10/203,026
(22) PCT Filed: Feb. 1, 2001
(86) PCT No.: PCT/SE01/00184
§ 371 (c)(1),
(2), (4) Date: Oct. 21, 2002
(87) PCT Pub. No.: WO01/56843
PCT Pub. Date: Aug. 9, 2001

(65) Prior Publication Data
US 2003/0090101 A1 May 15, 2003

(30) Foreign Application Priority Data
Feb. 4, 2000 (GB) ............................................ 0002664

(51) Int. Cl.[7] ............................................ B60R 22/195
(52) U.S. Cl. ...................................... 280/806; 242/374
(58) Field of Search .......................... 280/806; 297/480; 242/374; B60R 22/195

(56) References Cited

U.S. PATENT DOCUMENTS

| | | | |
|---|---|---|---|
| 5,503,037 A | * | 4/1996 | Ruelein et al. ................... 74/2 |
| 5,607,185 A | | 3/1997 | Isaji et al. |
| 5,707,080 A | | 1/1998 | Isaji et al. |
| 5,794,978 A | | 8/1998 | Nishide |
| 5,863,009 A | | 1/1999 | Bauer et al. |
| 6,039,353 A | * | 3/2000 | Bauer et al. ................. 280/806 |

FOREIGN PATENT DOCUMENTS

| | | |
|---|---|---|
| DE | 29 10 158 A1 | 9/1980 |
| DE | 34 13 488 C2 | 1/1986 |
| EP | 0 587 191 A1 | 3/1994 |
| EP | 0 599 810 A2 | 6/1994 |
| GB | 2 237 180 B | 5/1991 |
| GB | 2281189 A | 3/1995 |
| WO | WO 96/13409 A1 | 5/1996 |

* cited by examiner

Primary Examiner—Ruth Ilan
(74) Attorney, Agent, or Firm—Venable LLP; Robert Kinberg (57) ABSTRACT A pretensioner for a safety-belt includes an elongate housing (1) defining a chamber (2) and a unit (3) for movement along the housing. The unit has an end element in the form of a piston (4) which is provided with balls (5) received in a groove (6) which enables the piston to move only in one direction. The piston is connected by a resilient spring (7) to a connector element (8) of a form corresponding to that of a piston (4). The connector element is connected (12) to one end of a wire (11) which is connected to part of a safety-belt. A peg (17) maintains the spring (7) compressed. When the pretensioner is actuating gas from a gas generator it is applied to the piston (4) moving the whole unit (3) within the housing whilst braking the peg (17). At the end of the movement the piston (4) cannot move back towards its initial position. Any subsequent slack appearing within the safety-belt is taken up by expansion of the spring (7). Once the spring has expanded, the connector (8) cannot move back towards its initial position.

16 Claims, 8 Drawing Sheets

SEAT-BELT PRE-TENSIONER

BACKGROUND OF THE INVENTION

It has been proposed previously to provide a seat-belt pretensioner adapted to apply tension to a seat-belt when an accident situation or a potential accident situation is detected. When the pretensioner operates the occupant of the seat is pulled tightly into the seat before a situation arises in which the occupant moves forwardly relative to the seat. Thus the seat-belt can maintain the occupant of the seat in a position which is as far as possible from the steering wheel or dashboard of the vehicle. Consequently it will be understood that the pretensioner minimises the distance that the occupant of the seat moves forwardly before the seat-belt retards that forward movement.

If a vehicle which is provided with a pretensioner is involved in an accident such as a roll over crash, the pretensioner will be activated and will serve to apply tension to the seat-belt, thus tending to hold the occupant of the seat firmly in position. However, during a roll over crash, the vehicle may impact the ground very severely, with the effect that the occupant of the seat moves downwardly into the seat, against the ordinary spring bias provided in the squab of the seat, or the back of the seat. This can create a "slack" in the seat-belt. This is disadvantageous and potentially dangerous. If the occupant of the seat bounces back towards the seat-belt, the occupant, travelling with a predetermined velocity, will engage the seat-belt, which will not yield, and this may injure the occupant of the seat. Also, if the seat belt is effectively "slack", the occupant of the seat may not be retained in position, and may move, relative to the seat.

It is to be appreciated that a slack may also occur in a seat-belt if, as a consequence of deformation of the vehicle, or deformation of the seat, during the roll over situation, the total distance between the anchoring points provided at the ends of the seat-belt becomes reduced.

SUMMARY OF THE INVENTION

The present invention seeks to provide a pretensioner which, in use, will reduce or obviate the disadvantages of the prior proposed pretensioners as discussed above.

According to this invention there is provided a pretensioner unit for use in pretensioner a safety-belt, the pretensioner unit incorporating an elongate housing, and a unit for movement along the housing, the unit having, at one end, an end-element associated with means which permit movement of the end-element in a first direction along the housing, but which prevent movement of the end-element in the opposite direction, the said end-element being connected to a compressed resilient means extending between said end-element and a connector element tending to bias the connector element away from the end-element, the said connector element connecting the resilient means to one end of an elongate flexible element, which flexible element is adapted to be connected to part of a safety-belt arrangement, compression maintaining means being provided which block movement of the connector element away from said end-element, thus maintaining compression within the resilient means, the pretensioner incorporating means to apply a force to said end-element to move the end-element in the first direction and to disable the compression maintaining means in response to an accident situation being detected, thus applying tension to the flexible element to draw in the flexible element, the resilient means then applying a biasing force to the connector element adapted to draw the flexible element into the housing should a safety-belt with which the unit is used become slack, there being means to prevent the flexible element from subsequently being paid out after having been drawn in.

Preferably the elongate flexible element comprises a wire or cable connected to a buckle forming part of a safety-belt arrangement.

Advantageously the unit is received within a generally cylindrical chamber within the elongate housing, the means which permit movement of the end-element in the first direction but not in the opposite direction comprising a peripheral groove formed in the end-piece, the groove being of tapering form and containing one or more elements moveable axially of the chamber within the groove.

Conveniently the resilient means comprises a helical compression spring.

Preferably the means to prevent the flexible element from subsequently being paid out after having been drawn in comprise a peripheral groove of tapering form formed on a peripheral wall of the connector element, the groove containing one or more elements engageable between the base of the groove and the wall of a chamber defined by the housing in which the unit is located.

Alternatively the means that prevent the flexible element from subsequently being paid out comprise a rotationally mounted element provided with teeth adapted to compress the flexible element against a plate in response to a tendency of the flexible element to be paid out.

Preferably the means to apply a force to the end-element comprise a gas generator adapted to supply gas to one face of the end-element, the end-element being in the form of a piston.

In one embodiment the compression maintaining means comprise a frangible element engaging said connector element, the frangible element being adapted to be broken when gas from the gas generator applies a predetermined force to the end-element.

In an alternative embodiment the compression maintaining means comprises a rigid elongate member which extends from the end element to the connector element, one end of the elongate member being connected to one said element, the other end of the elongate member passing through a bore in the other said element, the said other end of the elongate element being provided with a resilient catch initially engaging an abutment provided in the bore to prevent the elements moving apart, the compressed resilient means being partially compressed so that when said force is applied to the end element, the elongate member moves relative to the bore to move the resilient catch out of the bore, the resilient catch being adapted to become disengaged from the rigid member on being moved out of the bore.

Preferably the bore defines a main region having a first diameter and a terminal region having a larger diameter, the abutment being defined by the intersection between the main region and the terminal region.

Conveniently the resilient catch comprises a resilient ring compressible from a relatively large diameter to a relatively small diameter the resilient ring being such that, when compressed to the relatively small diameter, the resilient ring engages is retained in a groove formed in the rigid elongate member, the ring being retained in the groove by the side-wall of the bore.

In an alternative embodiment the compression maintaining means are adapted to be disabled in response to movement of a further piston which receives gas from the gas generator.

Conveniently the compression maintaining means comprises a pivotally mounted latch adapted, in one position, to engage and retain the connector element, part of the latch directly or indirectly engaging a stop to prevent the latch rotating to a release position, the stop being moveable by said further piston.

Preferably part of the pivotally mounted latch engages an elongate rod, the elongate rod engaging a stop constituted by a member moved by or formed integrally with said further piston.

Alternatively the further piston acts on one end of an elongate arm which is pivotally mounted for movement relative to the housing, the elongate arm carrying a finger which initially extends into the housing to engage the connector element, the elongate arm being pivotally movable, on actuation of the further piston, to a position in which the finger no longer engages the connector element.

Conveniently two further pistons are provided each connected with an associated said elongate arm.

In order that the invention may be more readily understood, and so that further features thereof may be appreciated, the invention will now be described, by way of example, with reference to the accompanying drawings in which:

DETAILED DESCRIPTION OF THE INVENTION

In embodiments of the invention a unit is provided which can move axially within a housing in a predetermined direction from a first position. One end of the unit comprises a blocking arrangement which enables the unit to move in the said one direction, but prevents the unit from moving in the opposite direction. Connected to the blocking arrangement is a spring which is initially compressed. The spring is connected to a connector element, and the connector element is connected to a wire or cable adapted to apply tension to part of a safety-belt. The arrangement is such that, in use, the entire unit may be moved over a first stage of movement to effect an initial pretensioning of the safety-belt. Subsequently the spring is released and is available to apply a further tension to the safety-belt should the safety-belt go slack for any reason. An arrangement is provided to ensure that once slack has been taken up by the described pretensioner, that slack is never effectively paid back out again.

Figure 1:
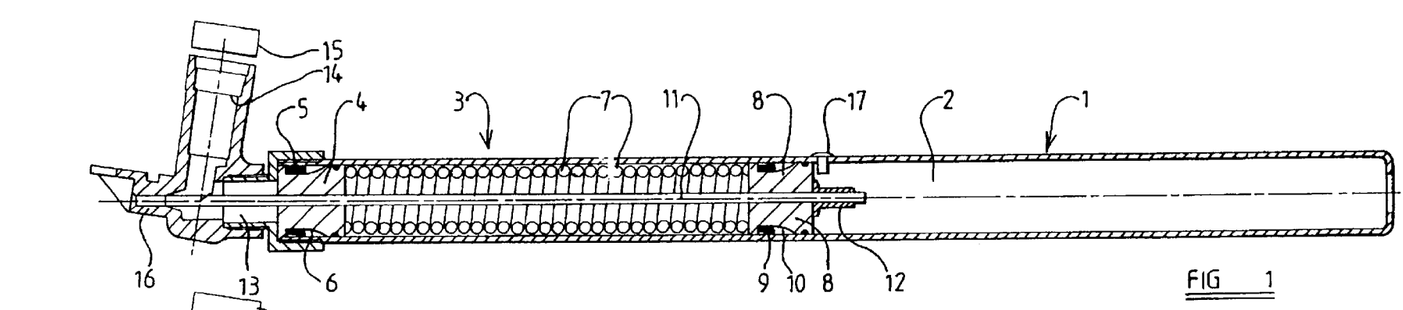
FIG. 1 is a sectional view of a first embodiment of a pretensioner in accordance with the invention in an initial state.
Figure 2:
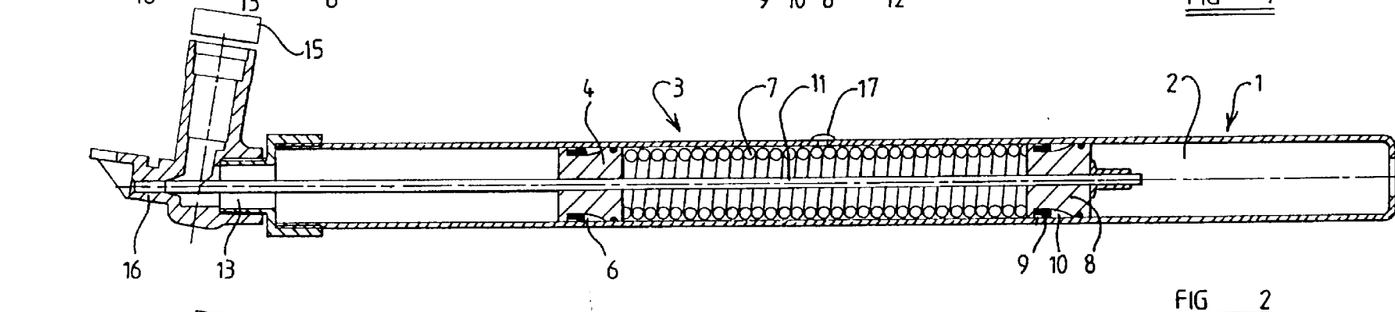
FIG. 2 is a view corresponding to FIG. 1 illustrating the pretensioner immediately after a first pretensioning step.
Figure 3:
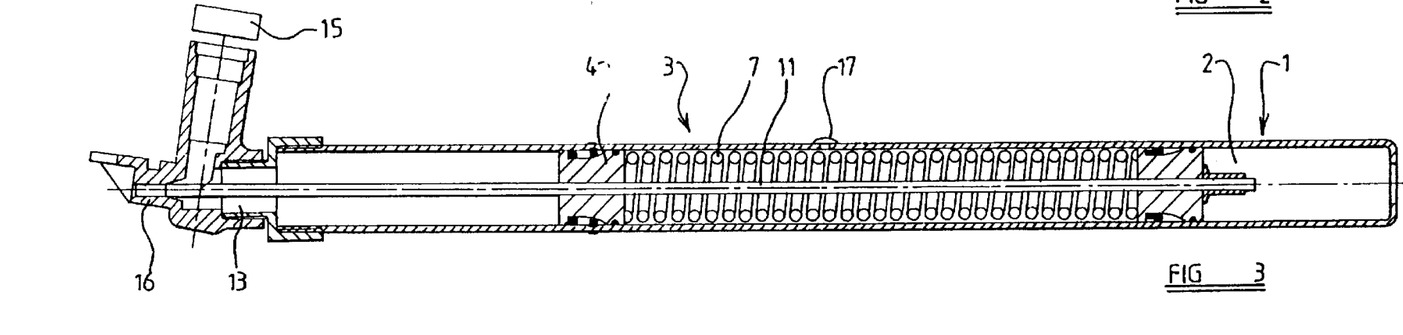
FIG. 3 is a view corresponding to FIG. 2 illustrating the situation that arises if further slack appears in a safety-belt associated with the pretensioner.

Referring initially to FIGS. 1 to 3 of the accompanying drawings, in a first embodiment of the invention an elongate generally cylindrical housing 1 is provided defining a cylindrical inner chamber 2. A unit 3 is provided for axial movement within the chamber 2. The unit 3 comprises an end element in the form of a piston 4 at one end of the unit. The piston 4 is slidable, but sealing fit within the chamber 2. The piston 4 is provided with a motion blocker which enables the piston 4 to move towards the right as shown in FIG. 1, but which prevents any movement of the piston towards the left, as shown in FIG. 1. The motion blocker is constituted by a plurality of balls 5 which are accommodated within an annular groove 6 which is formed about the outer periphery of the piston 4 so that the annular groove 6 faces the inner wall of the chamber 2. The annular groove 6 is of a tapering form so that the balls 5 may initially be accommodated within a relatively deep part of the groove. The narrow or tapering part of the groove 6 is directed towards the direction in which the piston 4 is free to move. It is to be appreciated that if the piston 4 moves towards the right as shown in FIG. 2, the balls 5 will be drawn into the deep part of the groove 6 and will not hinder that movement. However, if the piston 4 tends to move towards the left as shown in FIG. 3, the balls 5 will move towards the tapering portion of the annular groove 6 and will thus become firmly wedged between the base of the groove 6 and the side wall of the chamber 2, thus preventing movement of the piston 4 towards the left.

The unit 3 incorporates a helical compression spring 7 which extends from the piston 4 to a connector element 8. The spring 7 biases the connector element 8 away from the piston 4. The connector element 8 in this embodiment actually has a form very similar to that of the piston 4 and is provided with a motion blocker constituted by balls 9 within a peripheral groove 10 corresponding to the balls 5 and the groove 6 as described above.

A wire 11 is provided which extends through a bore in the piston 4, through the centre of the compression spring 7, and through a bore in the connector element 8 with part of the wire extending beyond the connector element 8. This end portion of the wire is provided with a wire stop 12 of large diameter which will not pass through the bore in the connector element 8.

Initially the unit 3 is located adjacent one end of the housing 1, with one face of the piston 4 in communication with a reduced diameter gas flow passage 13 to which is connected, by way of a connecting conduit 14, a gas generator 15. The gas flow passage 13 is adapted to provide gas to one end of the chamber 2.

The wire 11 passes through the gas supply duct 13 and passes out through a substantially gas-tight passage 16 to part of a safety-belt arrangement such as, for example, a seat-belt buckle.

A frangible peg 17 is provided which extends through an aperture in the housing 1 to extend into the chamber 2 where it engages the connector element 8 adjacent the wire stop 12. The spring 7 is thus maintained in a compressed form since the piston 4 is located at one end of the chamber 2 adjacent the reduced diameter gas duct 13 and thus can move no further towards the left, and the connector element 8 is prevented from moving towards the right by means of the frangible peg 17.

In the event that a roll over accident should occur, the gas generator 15 is activated and gas flows through the connecting duct 14 to the gas supply duct 13 where the gas acts directly on the piston 4. The pressure applied to the piston 4 tends to move the entire unit 3 towards the right, as shown in FIG. 1. The force of gas is sufficient to break the frangible peg 17 enabling the entire unit 3 to move towards the right within the housing 2 until the wire 11 has applied a substantial tension to the seat-belt. The spring 7, during this phase of operation of the pretensioner, is maintained in a compressed form since the force applied by the gas generator moves the piston 4 very swiftly, and with a very substantial force. Thus there is no tendency for the spring 7 to expand at that stage of the operation of the pretensioner, even though the spring 7 is no longer maintained in a compressed state by the peg 17. When the piston 4 reaches the position shown in FIG. 2, the balls 5 will move within the groove 6 thus locking the piston 4 in position, and preventing movement of the piston towards the left.

Should, for any reason, the seat-belt associated with the pretensioner become slack, the spring 7 may expand, moving the connector element 8 towards the right, as shown in FIG. 2 or FIG. 3. As the connector element 8 moves towards the right under the influence of the spring 7, tension will be reapplied to the safety-belt.

Should an increased force be applied to the safety-belt at any instant, for example if the occupant of the seat should be thrown firmly against the safety-belt, any tendency of the connector element 8 to move back towards the left will move the balls 9 towards the tapering portion of the annular groove 10, and thus any movement of the connector element 8 to the left is prevented, or rapidly terminated. Thus, once "slack" has been taken up by the pretensioner it will not be paid out again. If a situation arises in which slack has been taken up by the spring and movement of the connector element 8 towards the left is prevented should, subsequently, further slack arise within the safety-belt, the connector element 8 may still move further towards the right under the influence of the spring 7, again with any subsequent movement towards the left, as shown in FIGS. 2 and 3, being prevented.

Whilst, in this embodiment of the invention, the unit 3 is initially moved by gas from a gas generator, it is to be appreciated that in a modified embodiment of the invention, the unit 3 may initially be moved under the influence of a spring force provided from a very strong spring. In such an embodiment the strong spring would be associated with a mechanically operated blocking mechanism adapted to prevent movement of the unit 3 until an accident situation had been sensed. Thus the frangible peg 17 would be replaced by a mechanically retractable peg adapted to be retracted in the event that an accident should occur.

Figure 4:
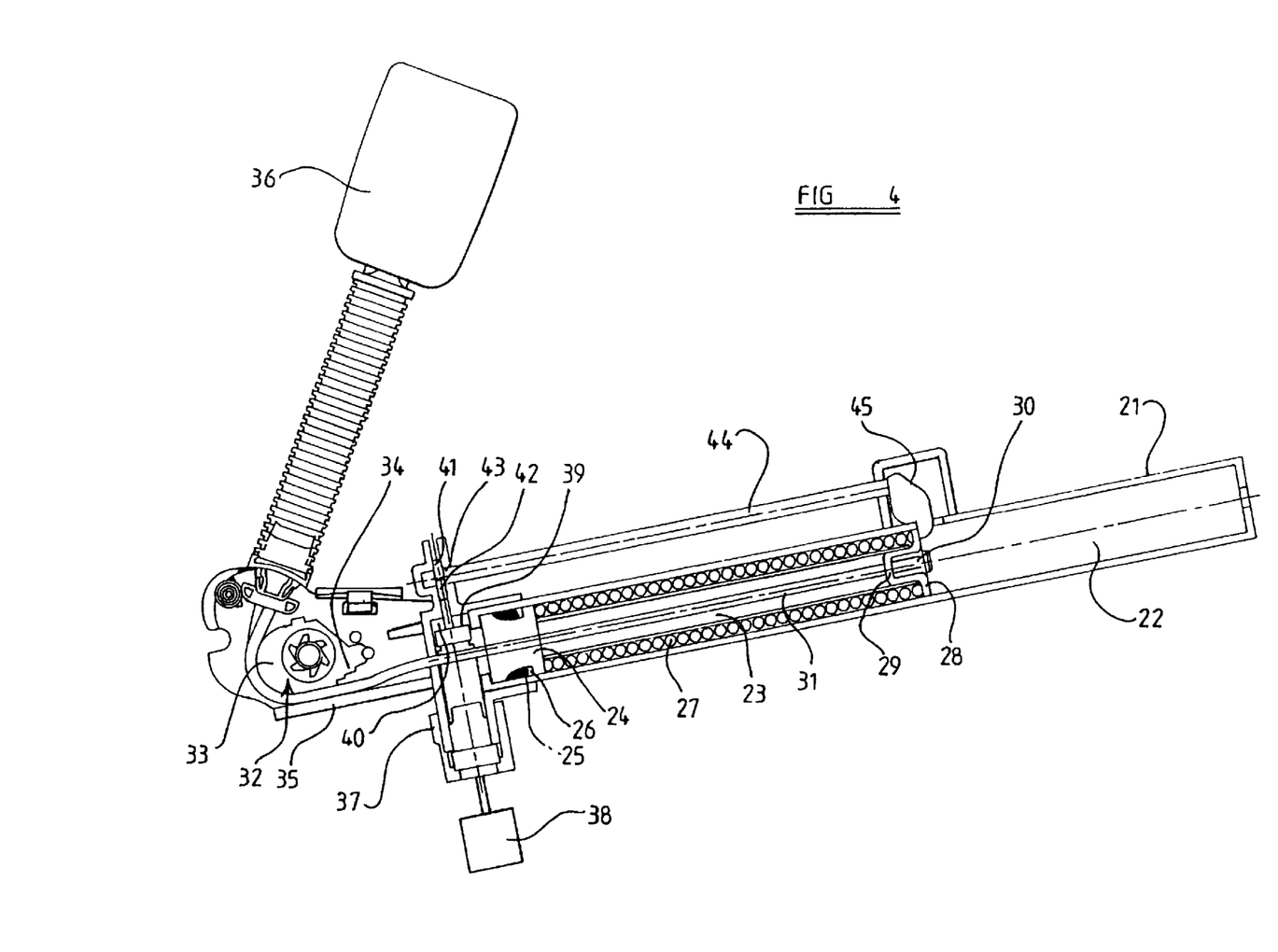
FIG. 4 is a part sectional and part diagrammatic view of an alternative embodiment of a pretensioner in accordance with the invention in the first condition.

FIG. 4 illustrates a modified embodiment of the invention. In the embodiment of FIG. 4, a housing 21 is provided defining a generally cylindrical chamber 22, and contained within the chamber 22 is a unit 23. The unit 23 has, at one end, a piston 24. The piston 24 is provided with a movement blocking means constituted by a plurality of balls 25 formed in a tapering groove 26 formed in the outer periphery of the piston. The balls 25 and groove 26 have a form equivalent of that of the balls 5 and grooves 6 described above.

The piston 24 engages one end of a compressed helical compression spring 27 which is received within the housing, the compression spring 27 extending to a connector element 28 in the form of an annular plate which defines a central recess 29 which engages a wire stop 30 provided on one end of a wire 31. The wire 31 extends through the central part of the compression spring 27 and through a bore provided within the piston 24. The wire 31 then passes a reverse movement blocking device 32 constituted by a pivotally mounted element 33 provided, in a selected region, with teeth 34, the element being adapted to rotate, on the application of tension to the wire 31 tending to withdraw wire 31 from the housing 21, so that the teeth 34 engage the wire 31 and press the wire against a plate 35. The wire 31 is connected to a buckle 36 forming part of a safety-belt arrangement.

A gas inlet 37 is provided adapted to introduce gas to one end of the housing 21 so that the gas can act on the piston 24. A gas generator 38 is provided to supply gas to the gas inlet 37. The gas inlet 37 also communicates with a free face of a piston 39 contained with a small chamber 40, the piston 39 having a piston rod 41 which is of plate like form. The piston rod 41 has an aperture 42 of a predetermined diameter formed therein. The piston rod 41 initially abuts one end 43 of an axially extending rod 44 which extends parallel with the housing 21. The piston rod acts as a stop. The other end of the rod 44 engages part of a pivotally mounted release latch 45, another part of the release latch 45 engaging the connector element 28. The spring force applied to the connector element 28 by the spring 27 will tend to pivot the latch 45 in such a way that an axial force is applied to the rod 44 which firmly engages the end 43 of the rod 44 with the piston rod 41. The latch indirectly contacts the stop constituted by the piston rod 41. Thus the connector 28 is prevented from moving towards the right, as shown. The arrangement maintains the spring 27 in a compressed state in which it biases the connector element 28 away from piston 24.

Figure 5:
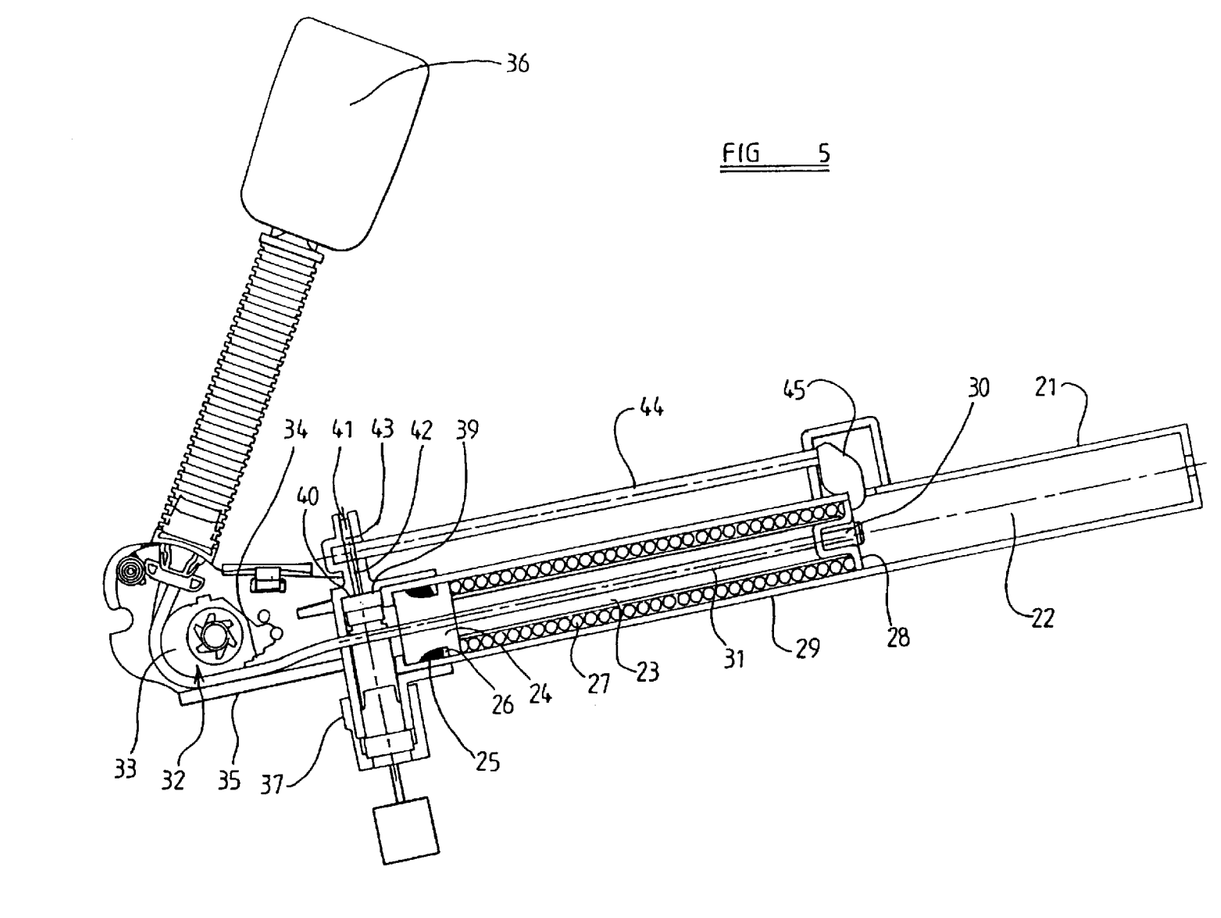
FIG. 5 is a view corresponding to FIG. 4 illustrating the pretensioner of FIG. 4 during an initial stage in a pretensioning process.
Figure 6:
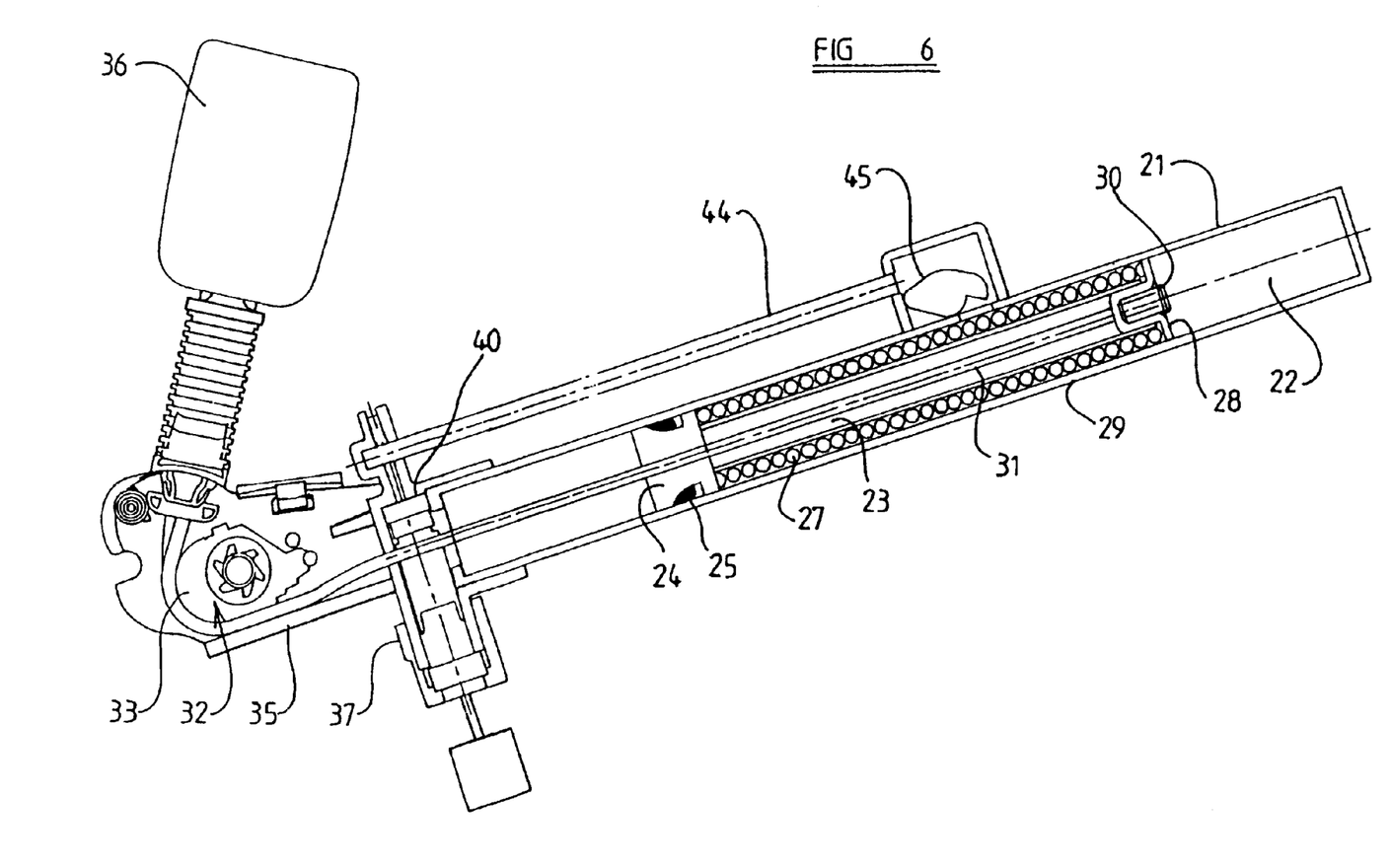
FIG. 6 is a view corresponding to FIG. 5 showing the situation after a very brief period of time has elapsed.

In response to an accident situation being detected, initially gas will be supplied, from the gas generator 38, to the gas inlet duct 37. Initially the gas will act on the exposed face of the piston 39 driving the piston into the chamber 40, and thus bringing the aperture 42 in the piston rod 41 into alignment with the rod 44. Thus the stop constituted by the piston rod 41 is moved away by the movement of the piston 39. At least the end part 43 of the rod 44 has a diameter which is less than the diameter of the aperture 42. Thus when the aperture 42 is aligned with the rod 44, the rod 44 is free to move towards the left. Under the spring bias applied to the latch 45, the rod does move to the left. Thus the latch 45 is pivoted to a position in which it no longer engages the connector element 28. Simultaneously gas pressure is applied to the exposed face of the piston 24, thus moving the piston 24, and consequently the entire unit 23, towards the right, as shown in FIG. 6. Thus, substantial tension is applied to the wire 31 tending to draw the buckle 36 downwardly, applying tension to the safety-belt. In this situation, movement of the piston 24 towards the left is prevented by the balls 25 within the groove 26.

Figure 7:
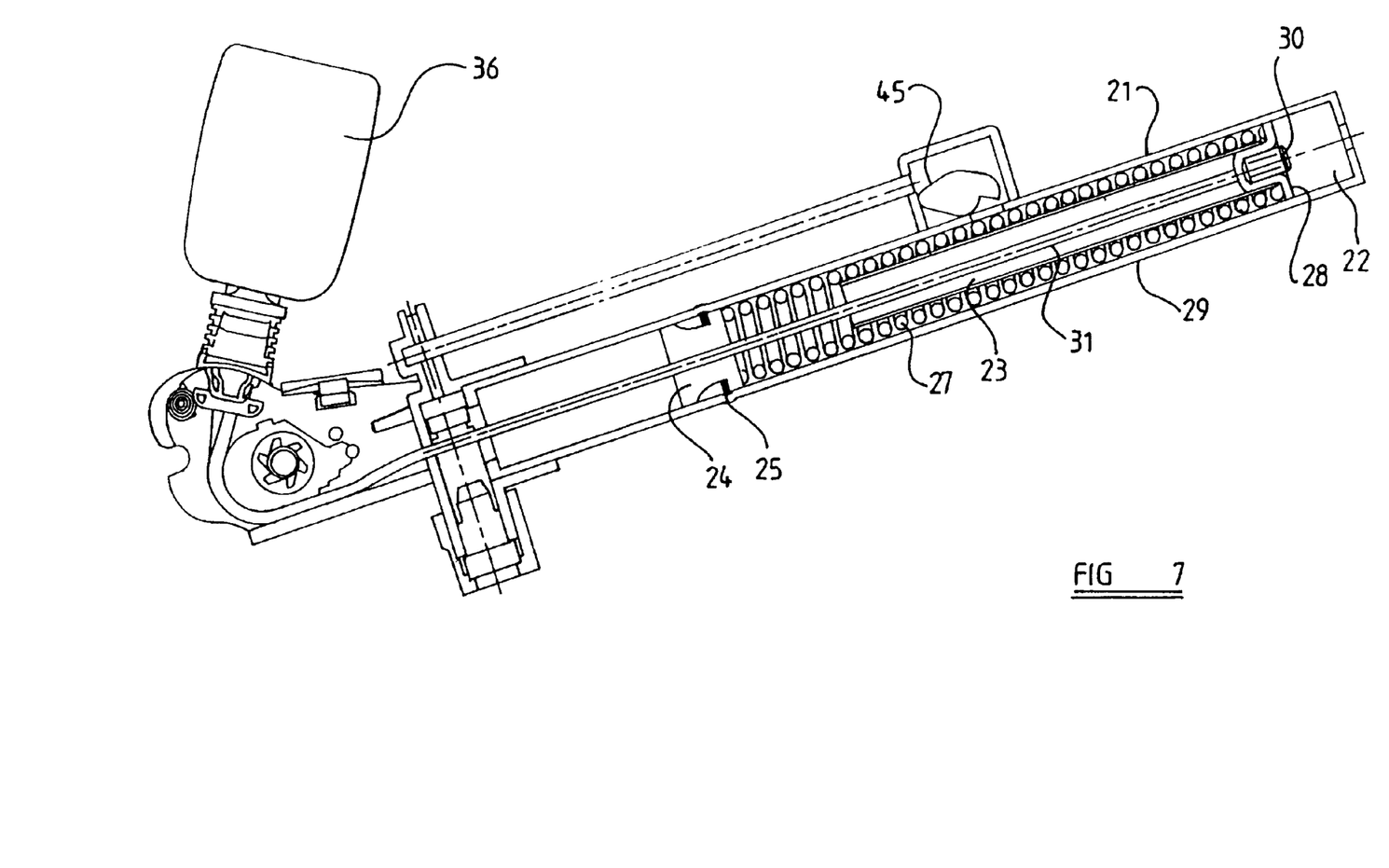
FIG. 7 is a view corresponding to FIG. 6 showing the situation that arises if subsequently further slack appears in a seat-belt associated with the illustrated pretensioner.

Should further slack appear within the safety-belt associated with the buckle, the spring 27 will move the connector element 28 axially of the housing 21 towards the right, as shown in FIG. 7. If there is any tendency for the buckle 36 to move upwardly, and the wire 31 to move towards the left within the housing, the element 33 will rotate in a clockwise sense and the teeth 34 will clamp the wire 31 against the plate 35. Thus, again, whilst the spring may act repeatedly to re-tension and re-tension again the seat-belt with which the pretensioner is utilised, should that seat-belt go slack for any reason, once the wire 31 has been drawn into the housing 21 to effect tensioning of the safety-belt, the wire will not be paid back out again.

Figure 8:
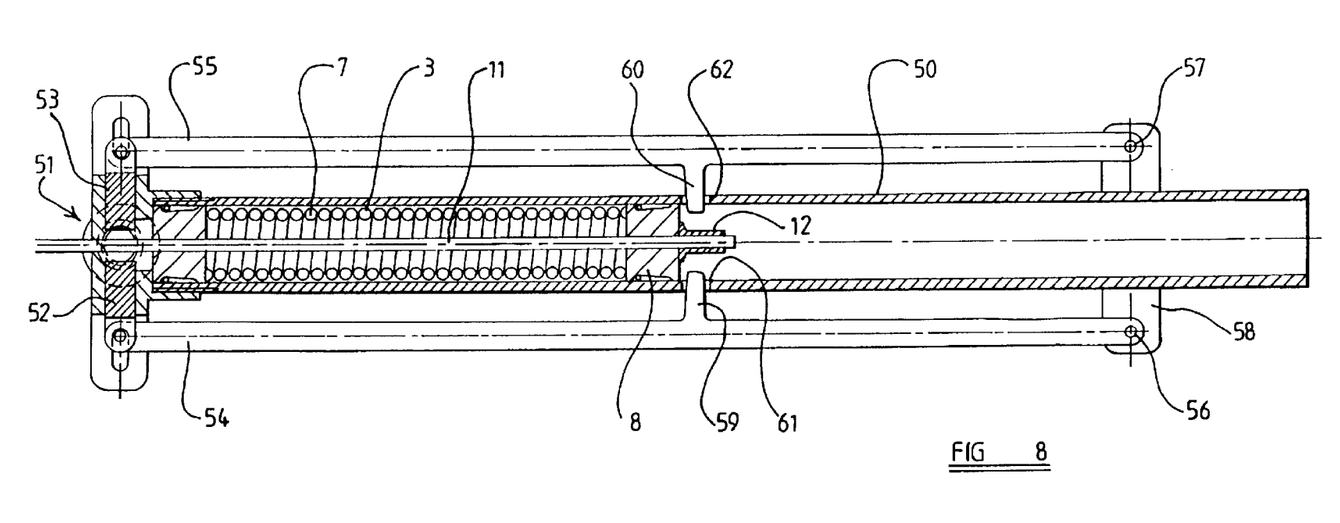
FIG. 8 is a sectional view of a modified embodiment of the invention in a first condition.
Figure 9:
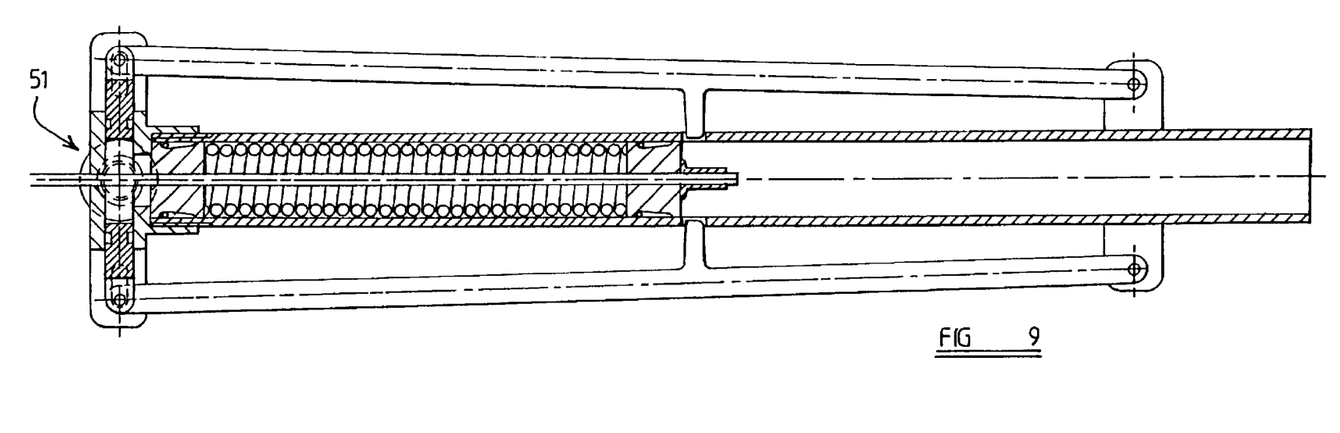
FIG. 9 is a view corresponding to FIG. 8 illustrating the embodiment of FIG. 8 at an initial stage in a pretensioning process.

FIG. 8 illustrates a modified embodiment of the invention which, in many respects, is similar to that of FIGS. 1 to 3, but wherein a pneumatically activated release mechanism is provided in place of the frangible peg.

In the embodiment shown in FIG. 8, a unit 3, which will not be re-described in detail since it is the same as the unit 3 of the embodiment of FIGS. 1 to 3, is provided within a housing 50. The housing 50 is provided with a gas inlet duct 51 at one end thereof. The housing 50 incorporates two oppositely acting pistons 52, 53, the end faces of which are exposed to the gas inlet duct 51. The pistons 52, 53 are thus adapted to be driven outwardly in opposite directions when gas is supplied to the gas inlet arrangement 51. The pistons 52, 53 are connected respectively to ends of elongate arms 54, 55 which extend generally parallel with the housing 50. The opposite ends of the arms 54, 55 are pivotally connected, by pivotal connections 56, 57 to a cross arm 58 which is secured to the housing 50. An intermediate part of each arm 54, 55 carries an inwardly directed finger 59, 60, and the fingers 59, 60 extend inwardly into the housing 50 through appropriate apertures 61, 62. The fingers, in an initial condition of the apparatus, are engaged by the connector element 8 of the unit 3 so that the spring within the unit 3 is maintained in a compressed condition.

When gas is supplied to the gas supply duct 51, in response to an accident being sensed, initially the pistons 52 and 53 move outwardly, thus moving the ends of the arms 54, 55 to which they are connected outwardly away from the housing 50. The arms 54, 55 thus execute a pivotal movement about the pivot points 56 and 57 on the cross-arm 58. This action is sufficient to withdraw the fingers 59 and 60 from within the housing 50, consequently enabling movement of the unit 3 towards the right. The unit 3 thus moves towards the right in the manner described above with reference to FIGS. 1 to 3.

The spring 7 of the unit 3 thus acts, in the manner described above with reference to FIGS. 1 to 3, to take up any "slack" that may occur by drawing in the wire 11, which prevents the wire 11 from being paid out again.

Figure 10:
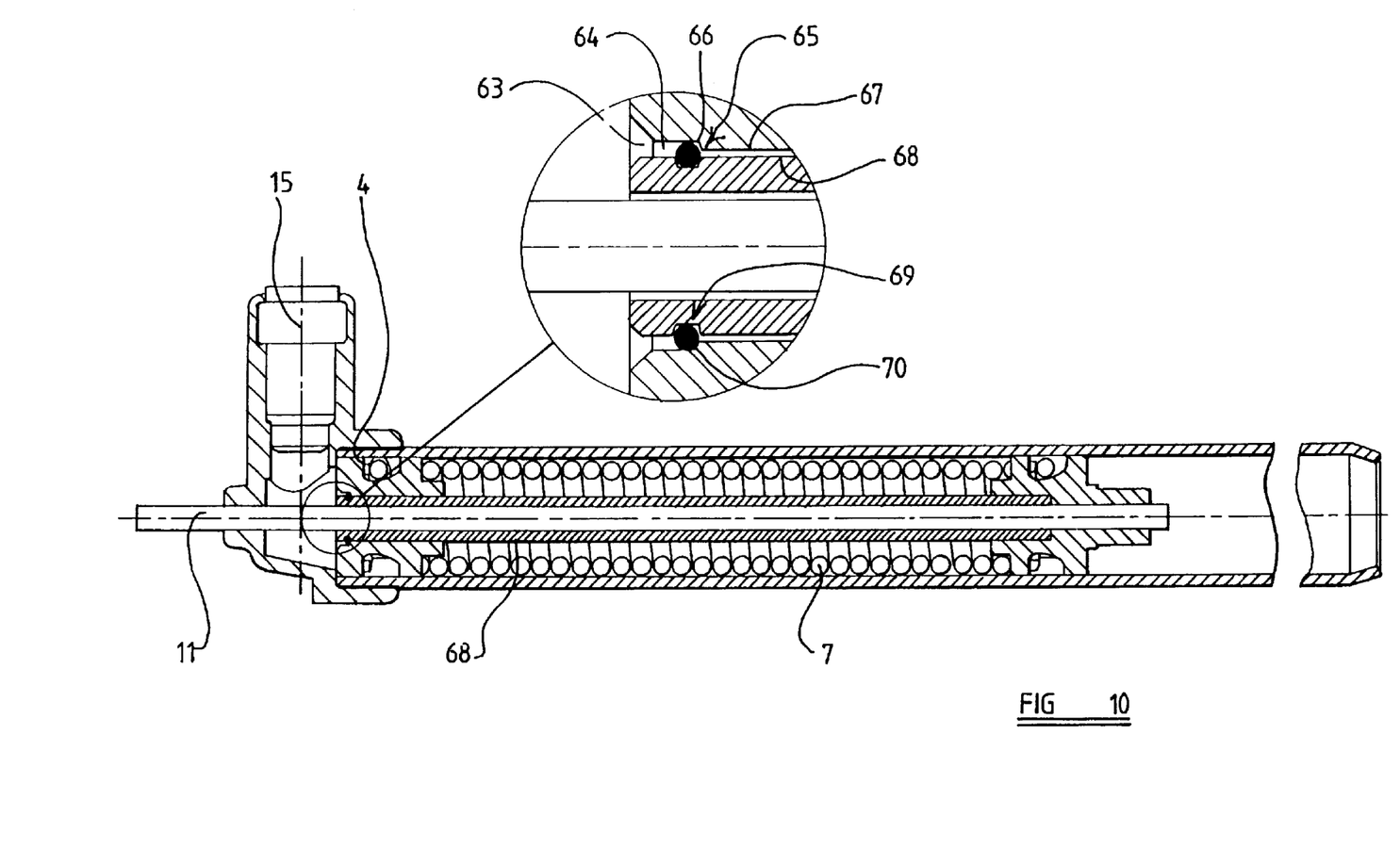
FIG. 10 is a sectional view of a modified embodiment of the invention in a first condition with part of the embodiment shown enlarged.

FIG. 10 illustrates a modified embodiment of the invention which, in many respects is similar to that of FIGS. 1 to 3, but wherein an alternative release mechanism is provided in place of the frangible peg.

In the embodiment shown in FIG. 10, a unit 3 (which will not be re-described in detail since it is similar to the unit 3 of the embodiment of FIGS. 1 to 3 and like parts thereof are identified by like references) is provided with a piston 4. The piston 4 is substantially identical to the piston 4 described with reference to FIGS. 1 to 3 except that the piston 4 has an end face 63 which has a central opening which tapers inwardly to a first part 64 of an axial bore 65 that passes through the piston 4.

The first part 64 of the bore 65 extends part way along the bore 65 and has a first relatively large diameter. The first part 64 terminates at an abutment 66 formed part way along the bore 65. The remaining part 67 of the bore is of lesser diameter than the first part 64. It is to be appreciated that the abutment 66 is defined by the interface between the first part 64 of relatively large diameter and the remaining part 67 of relatively small diameter.

The bore 65 is dimensioned to receive the wire 11 and one end of a substantially rigid elongate member in the form of a sleeve 68. The sleeve 68 surrounds, and is coaxial with, the wire 11. The one end of the sleeve 64 is provided, around part of its exterior, with an annular, circumferential groove 69. The sleeve 68 then extends from the one end, along the wire 11, to the connector element 8. The sleeve 68 is secured to part of the connector element 8 using adhesive. It is to be appreciated that any other method as is well known in the art may be used to secure the sleeve 68 to the connector element 8.

A resilient catch is provided in the form of a washer spring 70. The washer spring 70 is adapted to be resiliently compressed from a relatively large diameter to a relatively small diameter when a compression force is applied to the washer spring 70. When the compression force is removed, the washer spring 70 will expand from the relatively small diameter to the relatively large diameter. It is to be appreciated that any other form of resilient catch which may be compressed to a dimension that may be received in a relatively small diameter bore may alternatively be used. When decompressed, the washer spring 70 is dimensioned to have an inner diameter greater than the exterior diameter of the sleeve 68.

When the unit 3 is in the initial position shown in FIG. 10, the abutment 66 of the bore 65 is aligned with the groove 69 formed in the sleeve 68. In this initial position, the washer spring 70 is partially received in the groove 69. The washer spring 70 engages the abutment 66 of the bore 65 and thus the sleeve 68 is prevented from moving towards the right as shown in FIG. 10 relative to the bore 65 by the washer spring 70. The washer spring 70 is biased outwardly, relative to the groove 69, into engagement with the wall of the first part 64 of the bore 65 which has a diameter such that the washer spring 70 cannot expand to a size at which it becomes disengaged from the groove 69. Thus, when in this initial condition, the connector element 8 is prevented from moving away from the piston 4 and compression in the compression spring 7 is maintained. It is to be further appreciated that the compression spring 7 will, in this initial condition, be only partially compressed.

In the event that a roll over accident should occur, the gas generator 15 is activated and gas flows through the connecting duct 14 to the gas supply duct 13 where the gas acts directly on the piston 4. The pressure applied to the piston 4 tends to move the piston 4 towards the connector element 8 and thus the partially compressed compression spring 7 is further compressed. The movement of the piston 4 relative to the sleeve 68 moves the piston 4 away from the one end of the sleeve 68 provided with the annular groove 69 so that the one end of the sleeve 68 extends past the end face 63 of the bore 65. As the washer spring 70 is located in the annular groove 69 at the one end of the sleeve 68, the washer spring 70 will no longer be constrained by the first part 64 of the bore 65 of the piston 4. Thus, the washer spring 70 expands from its constrained diameter to a larger diameter where it is no longer retained in the annular groove 69. (See FIG. 11). The sleeve 68 and consequently the connector element 8 and the wire 11 are therefore free to move to the right as shown in FIG. 11 relative to the piston 4.

The gas pressure forces the piston 4 to the right until the initially partially compressed spring 7 is fully compressed.

The gas pressure then forces both piston 4 and connector element 8 to move to the right until the wire 11 has applied a substantial tension to the seat belt. The spring 7, during this phase of operation of the pretensioner, is maintained in a compressed form since the force applied by the gas generator moves the piston 4 very swiftly and with a very substantial force. Subsequent movement of the piston 4 and the connector element 8 towards the left is prevented by the balls 5 and 9 moving within the grooves 6 and 10 respectively.

Figures 11, 12:
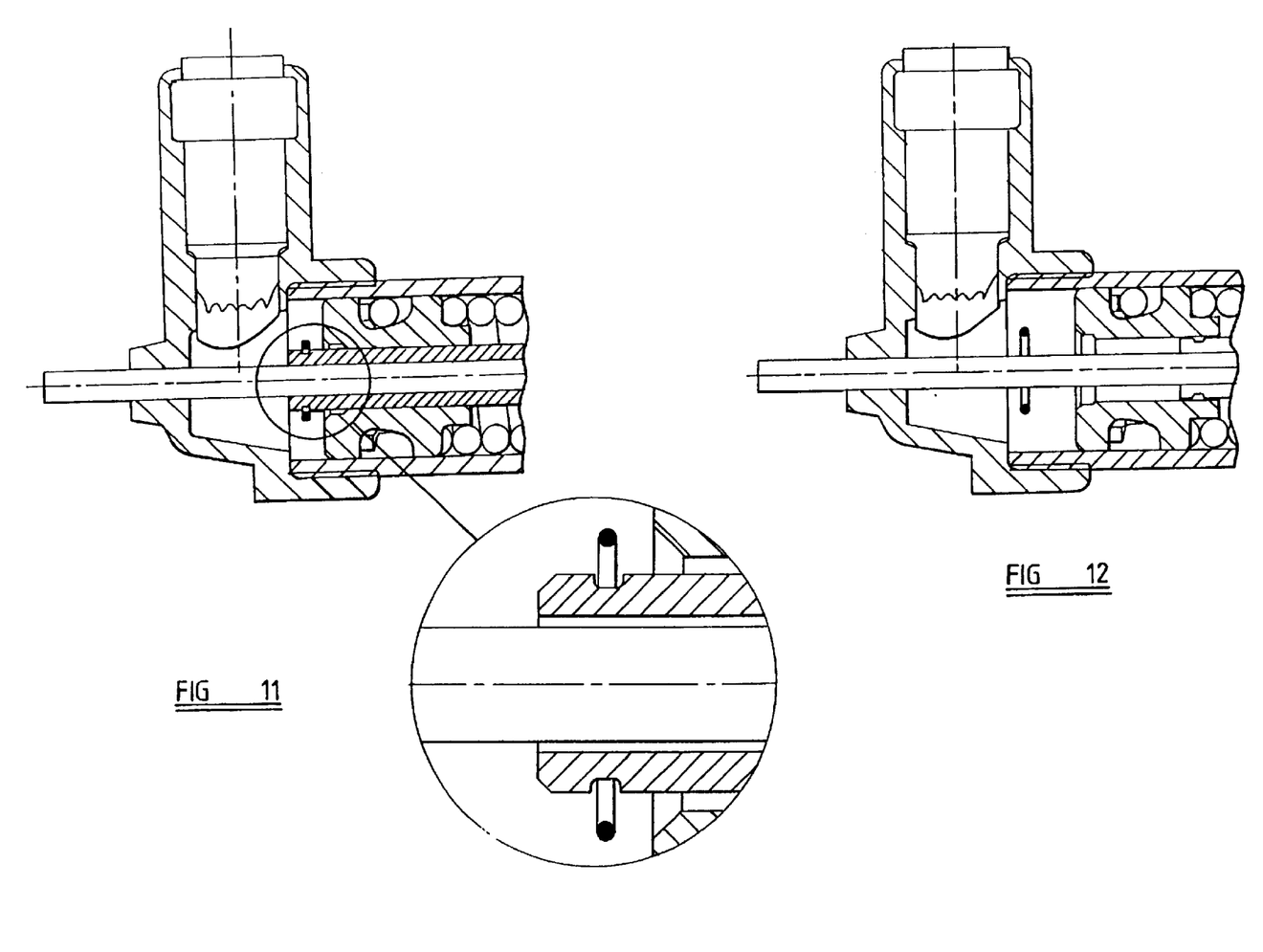
FIG. 11 is a view corresponding to FIG. 10 illustrating part of the embodiment of FIG. 10 at an initial stage in a pre-tensioning process again with part of the embodiment shown enlarged.
FIG. 12 is a view corresponding to FIG. 10 illustrating part of the embodiment of FIGS. 10 & 11 at a later stage in a pre-tensioning process.

Should for any reason the seat-belt associated with the pretensioner become slack, the spring 7 may expand, moving the connector element 8 towards the right under the influence of the spring 7 as shown in FIG. 12. As the connector element 8 moves towards the right it is retained in its new position by the balls 9.

What is claimed is:

1. A pretensioner for use in pretensing a safety-belt, the pretensioner unit incorporating an elongate housing, and a unit for movement along the housing, the unit having, at one end, an end-element associated with means which permit movement of the end-element in a first direction along the housing, but which prevent movement of the end-element in the opposite direction, said end-element being connected to an at least partially compressed resilient means extending between said end-element and a connector element tending to bias the connector element away from the end-element, said connector element connecting the resilient means to one end of an elongate flexible element, which flexible element is adapted to be connected to part of a safety-belt arrangement, compression maintaining means being provided which block movement of the connector element away from said end-element, thus maintaining compression within the resilient means, the pretensioner incorporating means to apply a force to said end-element to move the end-element in the first direction and to disable the compression maintaining means in response to an accident situation being detected, thus applying tension to the flexible element to draw in the flexible element, the resilient means then applying a biasing force to the connector element adapted to draw the flexible element into the housing should a safety-belt with which the unit is used become slack, there being means to prevent the flexible element from subsequently being paid out after having been drawn in.

2. The pretensioner according to claim 1 wherein the elongate flexible element comprises a wire or cable connected to a buckle forming part of the safety-belt arrangement.

3. The pretensioner according to claim 2 wherein the unit is received within a generally cylindrical chamber within the elongate housing, the means which permit movement of the end-element in the first direction but not in the opposite direction comprising a peripheral groove formed in the end-element, the groove being of tapering form and containing one or more elements moveable axially of the chamber within the groove.

4. The pretensioner according to claim 1 wherein the resilient means comprise a helical compression spring.

5. The pretensioner according to claim 1 wherein the means to prevent the flexible element from subsequently being paid out after having been drawn in comprise a peripheral groove of tapering form formed on a peripheral wall of the connector element, the groove containing one or more elements engageable between the base of the groove and the wall of a chamber defined by the elongate housing, said unit being located in the elongate housing.

6. The pretensioner according to claim 1 wherein the means that prevent the flexible element from subsequently being paid out comprise a rotationally mounted element provided with teeth adapted to compress the flexible element against a plate in response to a tendency of the flexible element to be paid out.

7. The pretensioner according to claim 1 wherein the means to apply a force to the end-element comprise a gas generator adapted to supply gas to one face of the end-element, the end-element being in the form of a piston.

8. The pretensioner according to claim 1 wherein the compression maintaining means comprise a frangible element engaging said connector element the frangible element being adapted to be broken when gas from a gas generator applies a predetermined force to the end-element.

9. The pretensioner to claim 1 wherein the compression maintaining means comprises a rigid elongate member which extends from the end element to the connector element, one end of the elongate member being connected to one said element, the other end of the elongate member passing through a bore in the other said element, said other end of the elongate element being provided with a resilient catch initially engaging an abutment provided in the bore to prevent the elements moving apart, the compressed resilient means being partially compressed so that when said force is applied to the end element, the elongate member moves relative to the bore to move the resilient catch out of the bore, the resilient catch being adapted to become disengaged from the rigid member on being moved out of the bore.

10. The pretensioner according to claim 9 wherein the bore defines a main region having a first diameter and a terminal region having a larger diameter, the abutment being defined by the intersection between the main region and the terminal region.

11. The pretensioner according to claim 9 wherein the resilient catch comprises a resilient ring compressible from a relatively large diameter to a relatively small diameter, the resilient ring being such that, when compressed to the relatively small diameter, the resilient ring is retained in groove formed in the rigid elongate member, the ring being retained in the groove by the sidewall of the bore.

12. The pretensioner according to claim 7 wherein the compression maintaining means are adapted to be disabled in response to movement of a further piston which receives gas from the gas generator.

13. The pretensioner according to claim 12 wherein the compression maintaining means comprises a pivotally mounted latch adapted, in one position, to engage and retain the connector element, part of the latch directly or indirectly engaging a stop to prevent the latch rotating to a release position, the stop being moveable by said further piston.

14. The pretensioner according to claim 13 wherein part of the pivotally mounted latch engages an elongate rod, the elongate rod engaging a stop constituted by a member moved by or formed integrally with said further piston.

15. The pretensioner according to claim 12 wherein the further piston acts on one end of an elongate arm which is pivotally mounted for movement relative to the housing, the elongate arm carrying a finger which initially extends into the housing to engage the connector, the elongate arm being pivotally movable, on actuation of the further piston, to a position in which the finger no longer engages the connector.

16. The pretensioner according to claim 15 wherein two further pistons are provided each connected with an associated said elongate arm.

* * * * *